(12) United States Patent
Steinbuchel, IV

(10) Patent No.: US 11,909,148 B2
(45) Date of Patent: Feb. 20, 2024

(54) CORDSET ELECTRIC VEHICLE SUPPLY EQUIPMENT (EVSE) WITH ROTATING PLUG BLADES

(71) Applicant: Webasto Charging Systems, Inc., Monrovia, CA (US)

(72) Inventor: Herman Joseph Steinbuchel, IV, Pasadena, CA (US)

(73) Assignee: WEBASTO CHARGING SYSTEMS, INC., Monrovia, CA (US)

( * ) Notice: Subject to any disclaimer, the term of this patent is extended or adjusted under 35 U.S.C. 154(b) by 40 days.

(21) Appl. No.: 17/586,276

(22) Filed: Jan. 27, 2022

(65) Prior Publication Data

US 2023/0238756 A1 Jul. 27, 2023

(51) Int. Cl.
*H01R 27/00* (2006.01)
*H01R 13/66* (2006.01)
*B60L 1/00* (2006.01)

(52) U.S. Cl.
CPC ............... *H01R 27/00* (2013.01); *B60L 1/00* (2013.01); *H01R 13/6683* (2013.01)

(58) Field of Classification Search
CPC ........ H01R 27/00; H01R 13/6683; B60L 1/00
USPC .................................. 439/171–174
See application file for complete search history.

(56) References Cited

U.S. PATENT DOCUMENTS

| | | | | | |
|---|---|---|---|---|---|
| 2,097,257 | A | * | 10/1937 | Schank | H01R 27/00 439/173 |
| 2,417,928 | A | * | 3/1947 | Guernsey | H01R 27/00 439/52 |
| 2,450,657 | A | * | 10/1948 | Guernsey | H01R 27/00 439/52 |
| 2,989,719 | A | * | 6/1961 | Aarlaht | H01R 27/00 439/103 |
| 3,838,385 | A | * | 9/1974 | Bloomingdale | H01R 13/44 439/259 |
| 4,386,333 | A | * | 5/1983 | Dillan | H01R 27/00 439/43 |
| 4,900,270 | A | * | 2/1990 | Edwards | H01R 31/06 439/502 |
| 5,295,845 | A | * | 3/1994 | Changxing | H01R 27/02 439/171 |
| 6,328,584 | B1 | * | 12/2001 | Follett | H01R 27/00 439/222 |
| 8,876,541 | B1 | * | 11/2014 | Wu | H01R 27/00 439/173 |
| 10,161,806 | B2 | * | 12/2018 | Lermann | G01K 1/12 |
| 2004/0097114 | A1 | * | 5/2004 | Shiroshita | H01R 31/06 439/174 |
| 2004/0219823 | A1 | * | 11/2004 | Greene | H01R 13/465 439/488 |
| 2009/0081895 | A1 | * | 3/2009 | Lee | H01R 31/06 439/173 |

(Continued)

*Primary Examiner* — Gary F Paumen
(74) *Attorney, Agent, or Firm* — Concept IP LLP; Michael Zarrabian

(57) ABSTRACT

Systems, devices, and methods including a cordset having a housing, the cordset comprising: a first rotatable blade, where the first rotatable blade is rotatable between a first vertical first blade position and a second horizontal first blade position; a second rotatable blade, where the second rotatable blade is rotatable between a first vertical second blade position and a second horizontal second blade position; and a fixed ground prong.

17 Claims, 16 Drawing Sheets

(56) References Cited

U.S. PATENT DOCUMENTS

2015/0295348 A1\* 10/2015 Konias .................. H01R 13/53
439/283
2017/0125957 A1\* 5/2017 Ejiri ...................... H01R 27/00
2019/0013766 A1\* 1/2019 Stach ....................... H02J 7/35
2020/0059035 A1\* 2/2020 Denzinger ........... H01R 13/521

\* cited by examiner

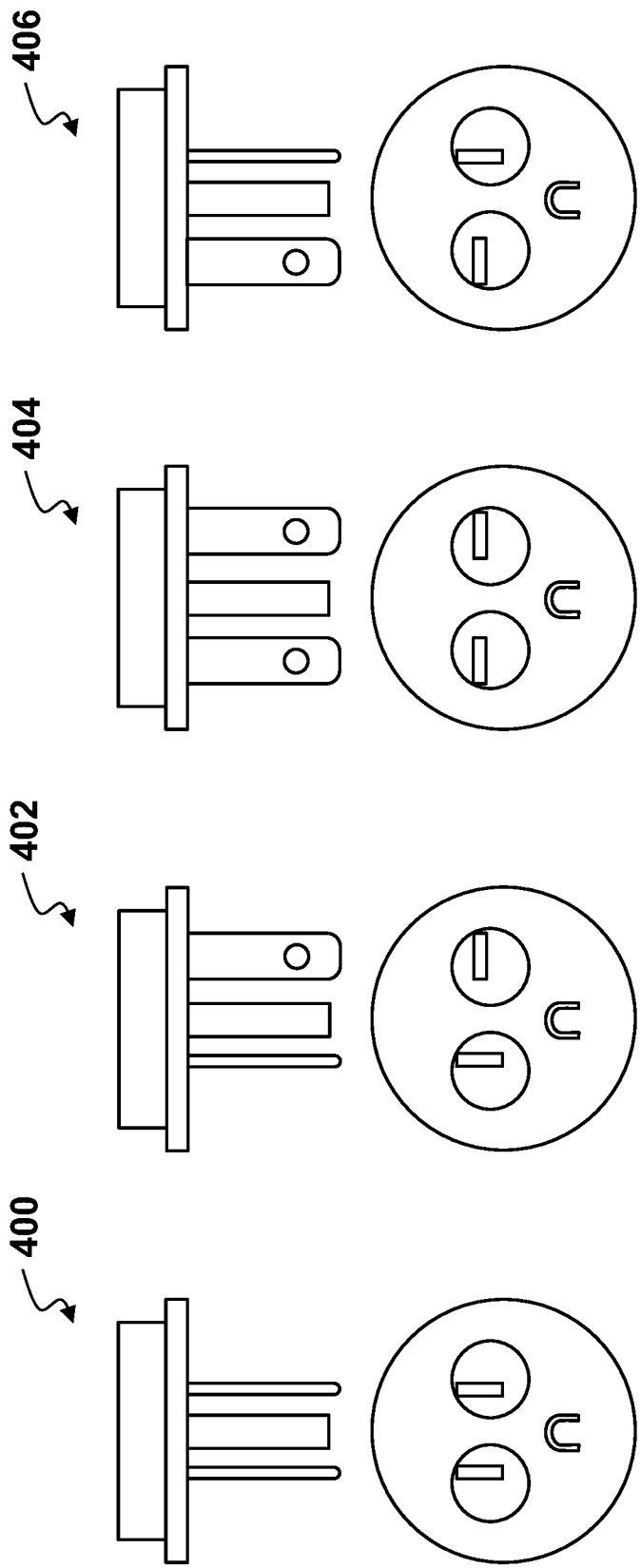

CORDSET ELECTRIC VEHICLE SUPPLY EQUIPMENT (EVSE) WITH ROTATING PLUG BLADES

FIELD OF ENDEAVOR

The invention relates to electrical chargers, and more particularly to electric vehicle supply equipment (EVSE).

BACKGROUND

An electrical connector is an apparatus used to transfer electricity from a power supply to a utility device, such as an electrical vehicle (EV). Electrical connectors generally have an internal connection that electrically connects one end of an electrical connector to the other end of the electrical connector. Some electrical connectors may have the ability to receive varying amperages and voltages from a utility power source for charging with the use of one or more physical adapters.

SUMMARY

A system embodiment may include: a cordset having a housing, the cordset comprising: a first rotatable blade, where the first rotatable blade may be rotatable between a first vertical first blade position and a second horizontal first blade position; a second rotatable blade, where the second rotatable blade may be rotatable between a first vertical second blade position and a second horizontal second blade position; and a fixed ground prong.

In additional system embodiments, the cordset may further comprise: a first seal disposed about the first rotatable blade. In additional system embodiments, the cordset may further comprise: a first wire connected to the first rotatable blade, where the first wire may be at least one of: coiled, flexible, and rotatable. In additional system embodiments, the cordset may further comprise: a second seal disposed about the second rotatable blade. In additional system embodiments, the cordset may further comprise: a second wire connected to the second rotatable blade, where the second wire may be at least one of: coiled, flexible, and rotatable.

In additional system embodiments, the cordset may further comprise: an auxiliary contact connected to the second rotatable blade, where the auxiliary contact rotates with the second rotatable blade between the first vertical second blade position and the second horizontal second blade position. In additional system embodiments, the cordset may further comprise: a set of contacts, where the set of contacts close when contacted by auxiliary contact when the second rotatable blade may be in the second horizontal second blade position, and where the set of contacts open when not contacted by auxiliary contact when the second rotatable blade may be in the first vertical second blade position.

In additional system embodiments, the cordset may further comprise: a rotation sensor connected to the second rotatable blade; and a sensor pair, where the sensor pair may be configured to determine a position of the rotation sensor as at least one of: the first vertical second blade position and the second horizontal second blade position. In additional system embodiments, the rotation sensor may be a Hall effect sensor and the sensor pair may be a magnet [or any other position sensing means].

Additional system embodiments may include: an electronics, where the electronics are in communication with the first rotatable blade and the second rotatable blade. In additional system embodiments, the electronics may be configured to recognize a plug type the cordset may be connected to based on at least one of: a voltage between the first rotatable blade and the second rotatable blade, and a position of the second rotatable blade as the first vertical second blade position and the second horizontal second blade position.

A method embodiment may include: rotating a first rotatable blade between a first vertical first blade position and a second horizontal first blade position; detecting, via an electronics, a voltage between the first rotatable blade and a second rotatable blade of a cordset; and providing, via the electronics, at least one of: a 15 Amp 120 Volt charge and a 20 Amp 240 Volt charge.

In additional method embodiments, the first rotatable blade may be rotated to the first vertical first blade position when the electronics provides the 15 Amp 120 Volt charge. In additional method embodiments, the first rotatable blade may be rotated to the second horizontal first blade position when the electronics provides the 20 Amp 240 Volt charge. In additional method embodiments, a second blade of the cordset may be in a vertical second blade position, where the vertical second blade position of the second blade may be parallel to the first vertical first blade position.

Another method embodiment may include: determining a position of a first rotatable blade between a first vertical first blade position and a second horizontal first blade position; rotating a second rotatable blade between a first vertical second blade position and a second horizontal second blade position; detecting a position of the second rotatable blade; and providing, via the electronics, at least one of: a 15 Amp 120 Volt charge, a 20 Amp 120 Volt charge, a 15 Amp 240 Volt charge, and a 20 Amp 240 Volt charge.

In additional method embodiments, detecting the position of the second rotatable blade comprises: detecting whether a set of contacts are closed or open, where the set of contacts are closed when an auxiliary contact connected to the second rotatable blade contacts the set of contacts in the first vertical second blade position, and where the set of contacts are open when the second rotatable blade may be in the second horizontal second blade position. In additional method embodiments, detecting the position of the second rotatable blade comprises: determining a position of the second rotatable blade via a sensor connected to the second rotatable blade and a sensor pair connected to a cordset housing.

In additional method embodiments, when the first rotatable blade may be determined to be in the first vertical first blade position, the provided charge may be 15 Amp 120 Volts when the detected position of the second rotatable blade may be the first vertical second blade position, and the provided charge may be 20 Amp 120 Volts when the detected position of the second rotatable blade may be the second horizontal second blade position. In additional method embodiments, when the detected position of the second rotatable blade may be the first vertical second blade position, the provided charge may be 15 Amp 120 Volts when the determined position of the first rotatable blade may be the first vertical first blade position, and the provided charge may be 20 Amp 240 Volts when the determined position of the first rotatable blade may be the second horizontal first blade position.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 4A depicts top and front views of the cordset EVSE in a NEMA 5-15 configuration, according to one embodiment;

FIG. 4B depicts top and front views of the cordset EVSE in a NEMA 5-20 configuration, according to one embodiment;

FIG. 4C depicts top and front views of the cordset EVSE in a NEMA 6-15 configuration, according to one embodiment;

FIG. 4D depicts top and front views of the cordset EVSE in a NEMA 6-20 configuration, according to one embodiment;

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Figure 1:
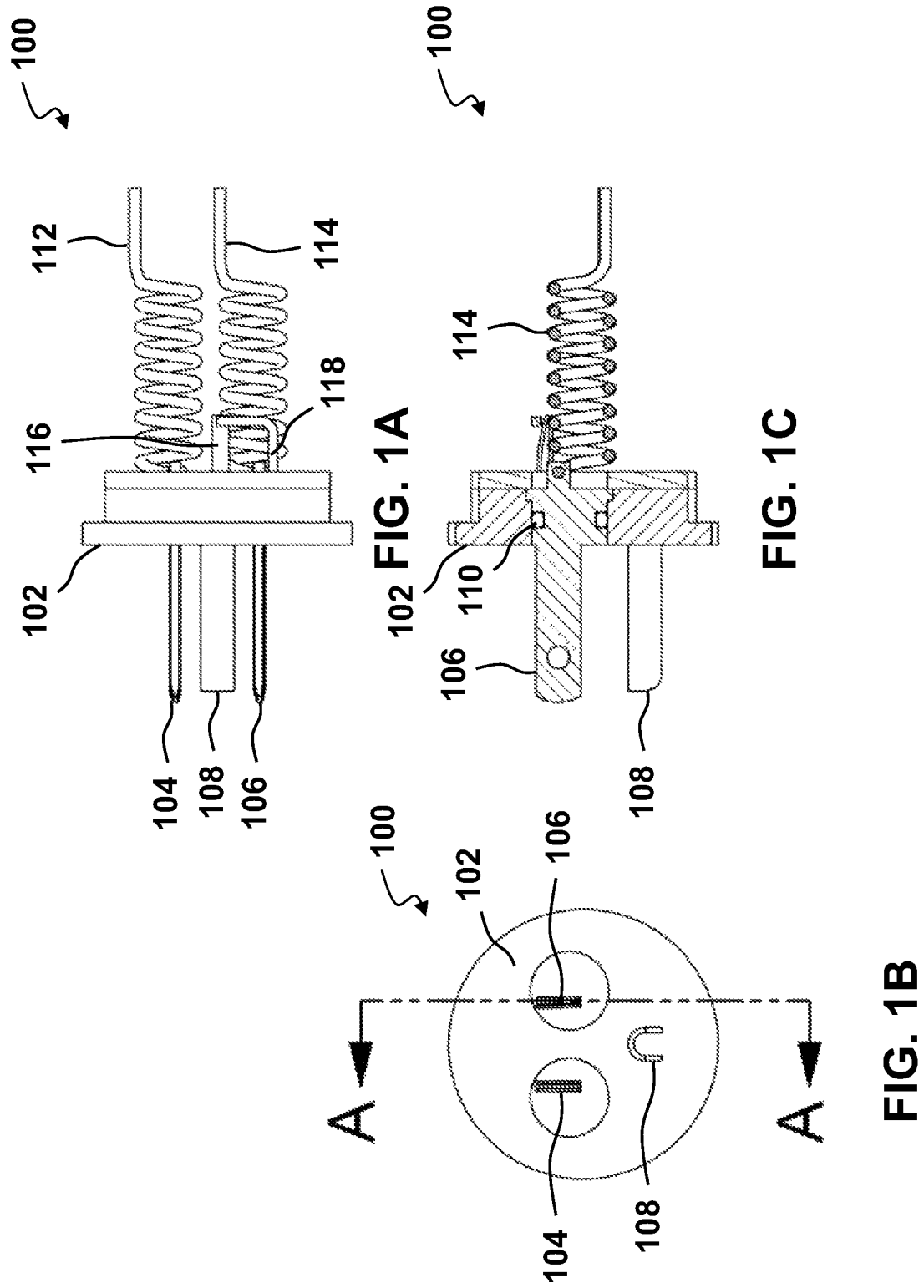
FIG. 1A depicts a top view of a cordset electric vehicle supply equipment (EVSE) having rotatable plug blades and a housing removed, according to one embodiment.
FIG. 1B depicts a front view of the cordset EVSE of FIG. 1A, according to one embodiment.
FIG. 1C depicts a cross sectional side view of the cordset EVSE of FIG. 1A about line A-A, according to one embodiment.

FIG. 1A depicts a top view of a cordset electric vehicle supply equipment (EVSE) 100 having rotatable plug blades and a housing removed, according to one embodiment. The cordset 100 includes a first rotatable blade 104, a second rotatable blade 106, and a fixed ground prong 108. The first rotatable blade 104, second rotatable blade 106, and fixed ground prong 108 may be disposed proximate a front portion 102 of the cordset 100. The first rotatable blade 104 may be connected to a first wire 112. In some embodiments, the first wire 112 may be a coiled wire. In other embodiment, the first wire 112 may be any flexible conductor such as a copper braid, a sliding contact, or the like. The second rotatable blade 106 may be connected to a second wire 114. In some embodiments, the second wire 114 may be a coiled wire. In other embodiment, the second wire 114 may be any flexible conductor such as a copper braid, a sliding contact, or the like. While coiled wires are shown, other wires that provide slack for rotatation of the respective blades 104, 106 are possible and contemplated. In one embodiment, the wires may have a helix shape, a spiral shape, and/or be a braided cable having a high amount of flexibility. An auxiliary contact 118 may be connected to the second rotatable blade 106. The auxiliary contact 118 may contact a set of contacts 116 to close the set of contacts 116 to provide an indication of a rotational position of the second rotatable blade 106. The set of contacts 116 may be attached to a portion of the cordset 100.

FIG. 1B depicts a front view of the cordset EVSE 100 of FIG. 1A, according to one embodiment. The first rotatable blade 104 is shown in a first vertical first blade position. The second rotatable blade 106 is shown in a first vertical second blade position. The fixed ground prong 108 is fixed in position and does not rotate.

FIG. 1C depicts a cross sectional side view of the cordset EVSE 100 of FIG. 1A about line A-A, according to one embodiment. The second rotatable blade 106 comprises a second seal 110 disposed between the second rotatable blade 106 and the front portion 102 of the cordset 100. The second seal 110 may be an o-ring seal in some embodiments. The second seal 110 may provide sufficient friction to maintain a position of the second rotatable blade 106 after rotation of the second rotatable blade 106. In some embodiments, the front portion 102 of the cordset 100 may include one or more detents to hold the second rotatable blade 106 in a desired orientation such as the first vertical second blade position and a second horizontal second blade position. The first vertical second blade position may be perpendicular to the second horizontal second blade position.

Figure 2:
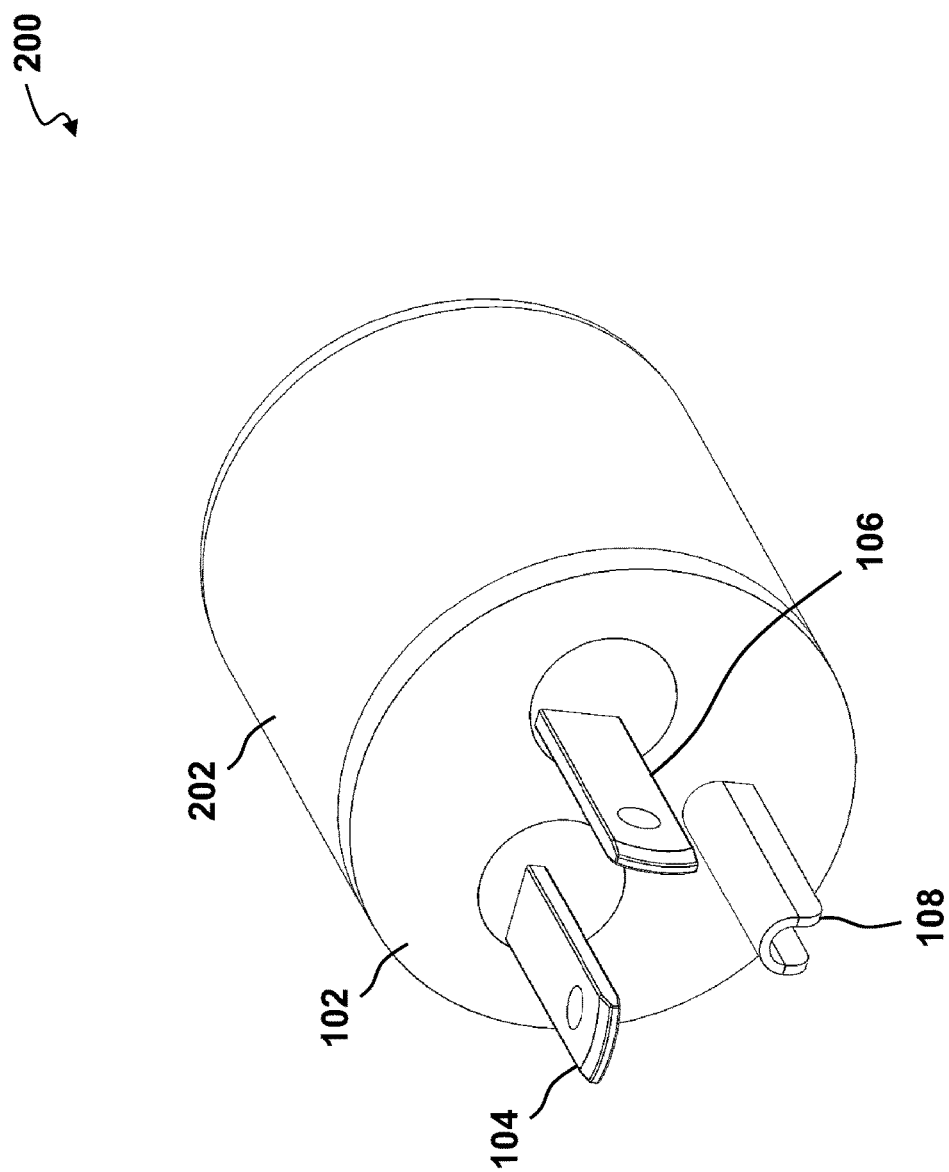
FIG. 2 depicts a front perspective view of a cordset EVSE with a housing, according to one embodiment.

FIG. 2 depicts a front perspective view of a cordset EVSE 200 with a housing 202, according to one embodiment. The cordset 200 includes a front portion 102 and a housing 202 attached to the front portion 102. The housing 202 may conceal the wires within the cordset 200.

Figure 3A:
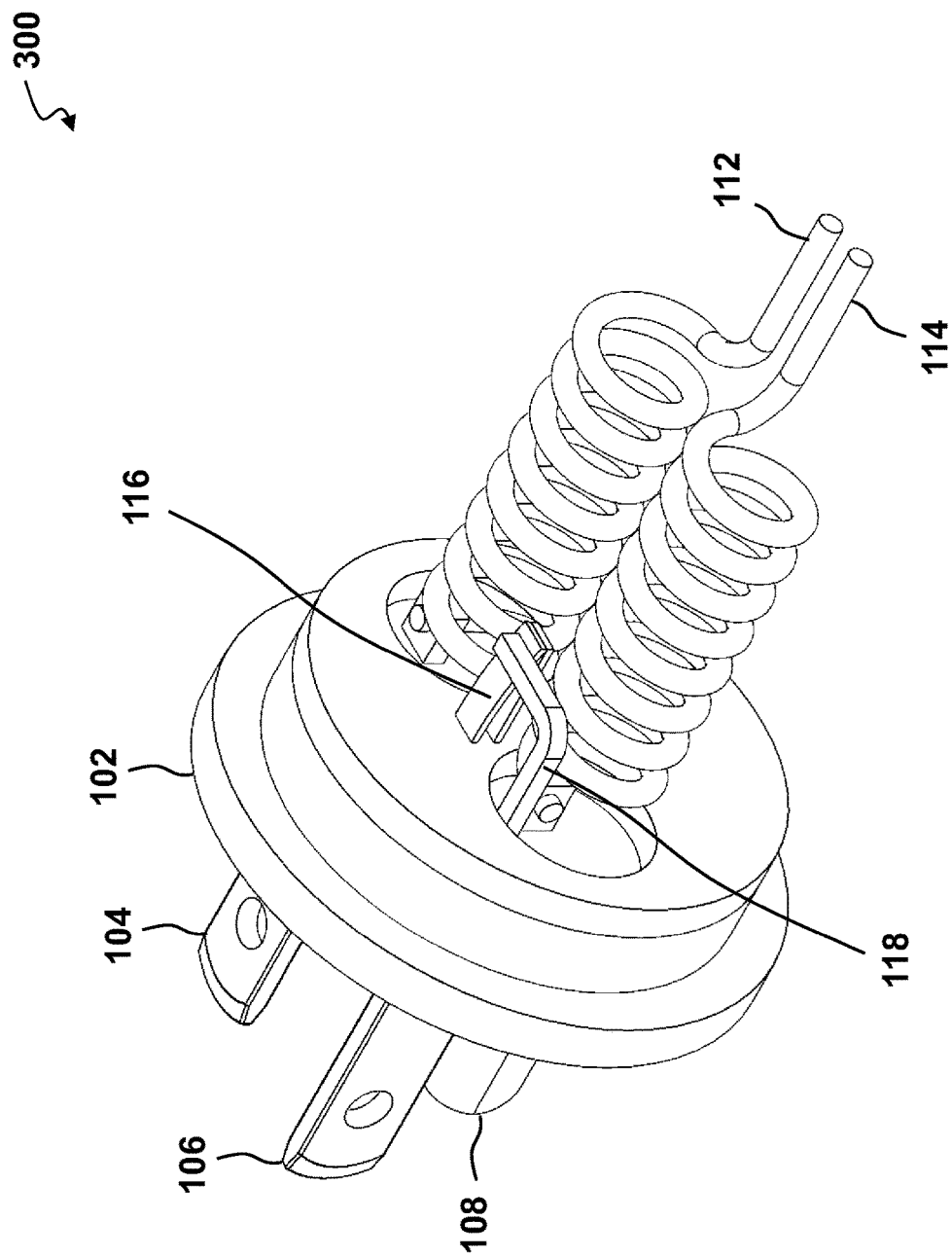
FIG. 3A depicts a rear perspective view of the cordset EVSE of FIG. 2 with the housing removed, according to one embodiment.

FIG. 3A depicts a rear perspective view of the cordset EVSE 300 of FIG. 2 with the housing removed, according to one embodiment. The first rotatable blade 104 is shown in a second horizontal first blade position. The second rotatable blade 106 is shown in a first vertical second blade position. The auxiliary contact 118 connected to the second rotatable blade 106 has been rotated such that it touches a top contact of the set of contacts 116 and forces the set of contacts closed. While an auxiliary contact 118 and set of contacts 116 is shown, other rotational detection sensors are possible and contemplated. In one embodiment, a hall effect sensor and magnet may be used to detect a rotational position of a plug blade. In another embodiment, an optical sensor with a shutter that goes between an emitter and receiver pair may be used to detect a rotational position of a plug blade. In another embodiment, an inductive sensor that senses a presence or absence of a ferromagnetic tab may be used to detect a rotational position of a plug blade.

Figure 3B:
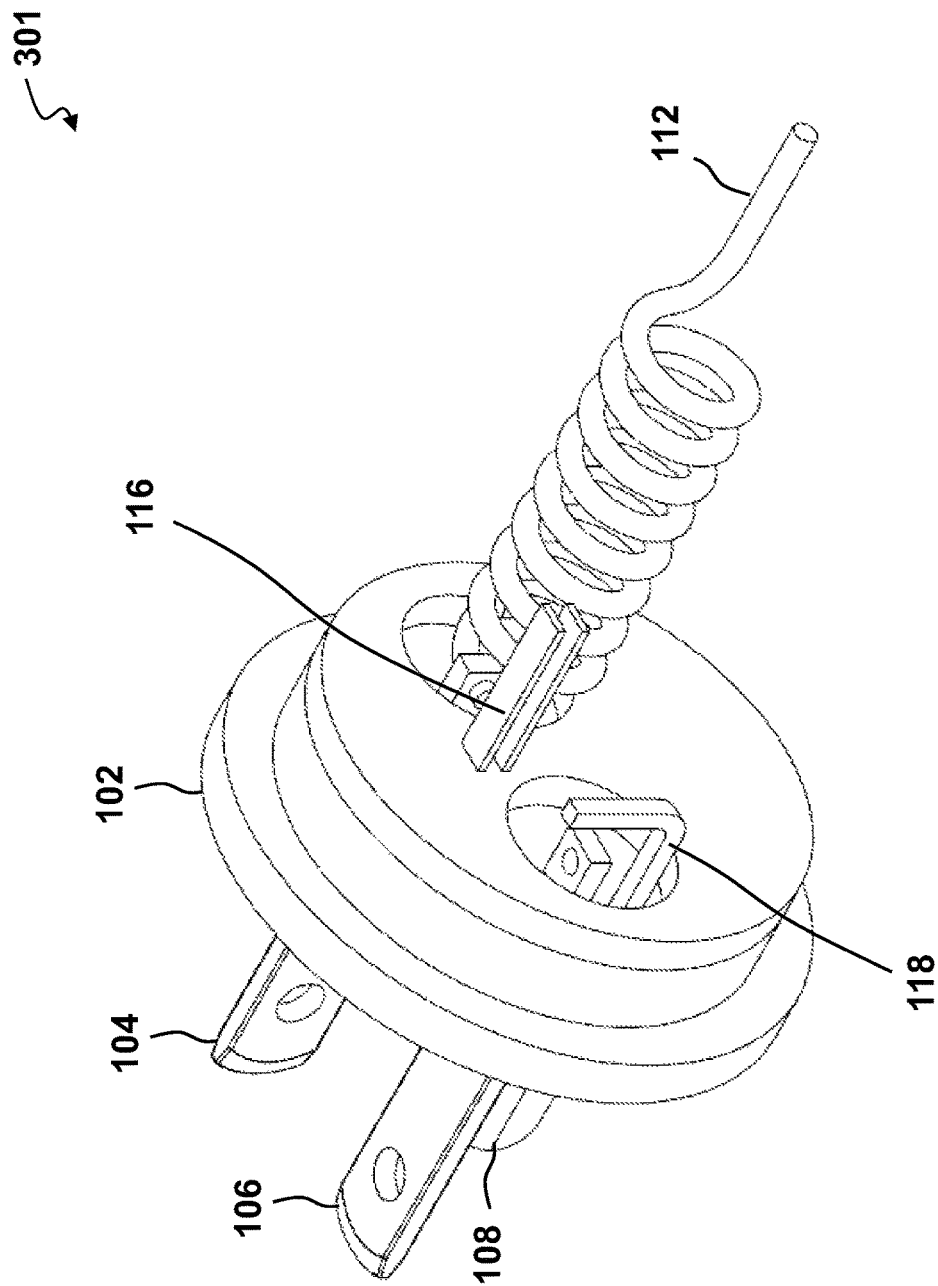
FIG. 3B depict a rear perspective view of the cordset EVSE of FIG. 3A with the housing and a second wire removed and with a second rotatable blade rotated to a horizontal position from a vertical position, according to one embodiment.

FIG. 3B depict a rear perspective view of the cordset EVSE 301 of FIG. 3A with the housing and a second wire removed and with a second rotatable blade 106 rotated to a horizontal position from a vertical position, according to one embodiment. When the second rotatable blade 106 is rotated to a first vertical second blade position, the auxiliary contact 118 is no longer touching the top contact of the set of contacts 116. In this position, the set of contacts 116 is not touching and the rotational position of the second rotatable blade 106 can be determined.

In a 120V plug, the first rotatable blade 104 may be connected to hot and the second rotatable blade 106 may be connected to neutral. In a 240V plug, the first rotatable blade 104 may be connected to hot and the second rotatable blade 106 may be connected to hot.

FIG. 4A depicts top and front views of the cordset EVSE in a NEMA 5-15 configuration 400, according to one embodiment. In the NEMA 5-15 configuration 400, the first rotatable blade is in a first vertical first blade position and the second rotatable blade is in a first vertical second blade position. In the NEMA 5-15 configuration 400, charging is provided at 15 Amps 120 Volts.

FIG. 4B depicts top and front views of the cordset EVSE in a NEMA 5-20 configuration 402, according to one embodiment. In the NEMA 5-20 configuration 402, the first rotatable blade is in a first vertical first blade position and the second rotatable blade is in a second horizontal second blade position. In the NEMA 5-20 configuration 402, charging is provided at 20 Amps 120 Volts.

FIG. 4C depicts top and front views of the cordset EVSE in a NEMA 6-15 configuration 404, according to one embodiment. In the NEMA 6-15 configuration 404, the first rotatable blade is in a second horizontal first blade position and the second rotatable blade is in a second horizontal second blade position. In the NEMA 6-15 configuration 404, charging is provided at 15 Amps 240 Volts.

FIG. 4D depicts top and front views of the cordset EVSE in a NEMA 6-20 configuration 406, according to one embodiment. In the NEMA 6-20 configuration 406, the first rotatable blade is in a second horizontal first blade position and the second rotatable blade is in a first vertical second blade position. In the NEMA 6-20 configuration 406, charging is provided at 20 Amps 240 Volts.

The NEMA 5-15 configuration 400 can be changed to the NEMA 5-20 configuration 403 by rotating the second rotatable blade to a second horizontal second blade position. In some embodiments, the second rotatable blade may be rotatable and the first blade may be fixed to allow for a change between a NEMA 5-15 configuration 400 and a NEMA 5-20 configuration 402. The NEMA 5-15 configuration 400 can be changed to the NEMA 6-20 configuration 406 by rotating the first rotatable blade to a second horizontal first blade position. In some embodiments, the first rotatable blade may be rotatable and the second blade may be fixed to allow for a change between a NEMA 5-15 configuration 400 and a NEMA 6-20 configuration 406.

Figure 5A:
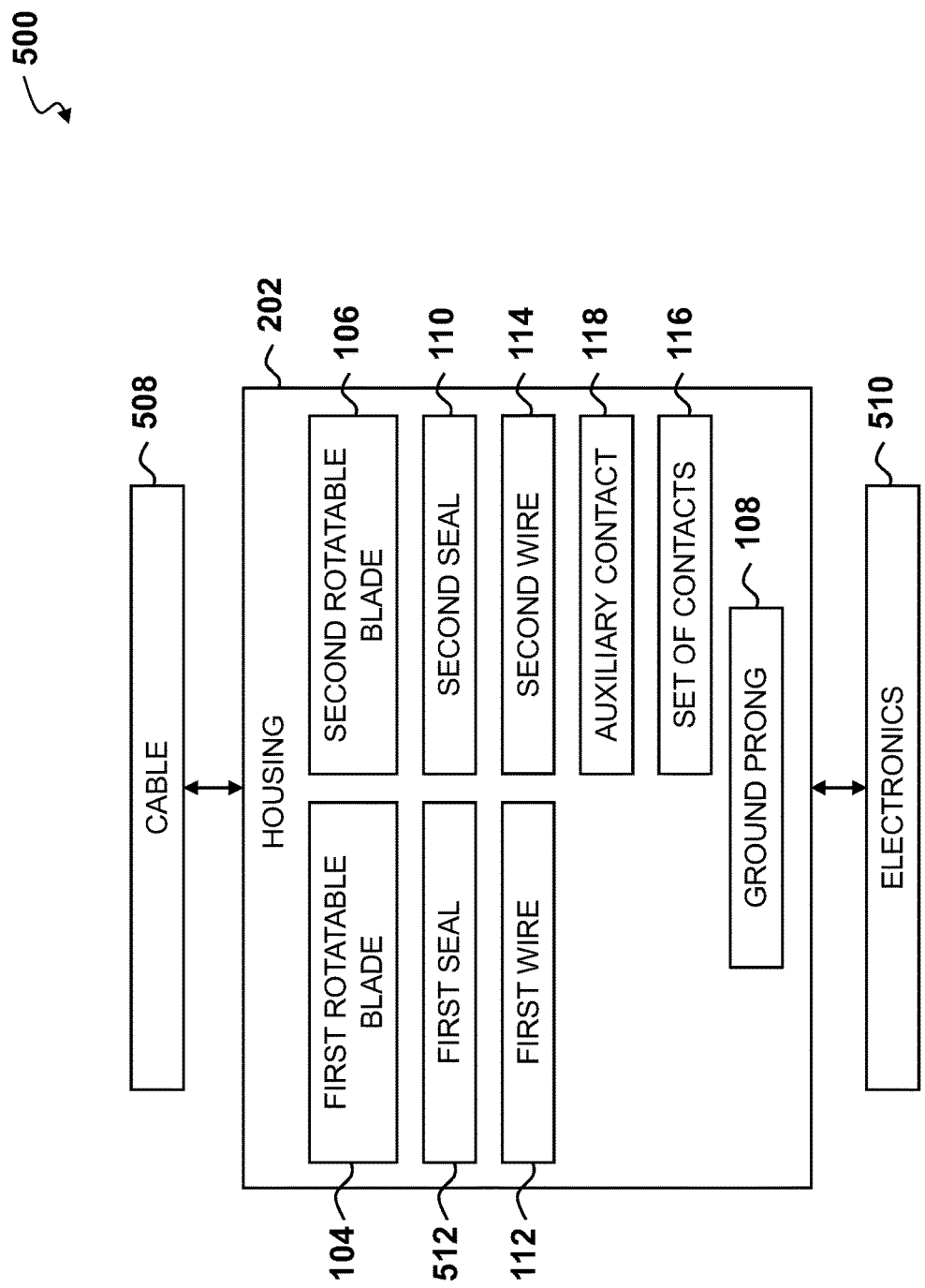
FIG. 5A depicts an exemplary system for a cordset EVSE having two rotatable plug blades with an auxiliary contact to detect rotation of a second plug blade, according to one embodiment.

FIG. 5A depicts an exemplary system for a cordset EVSE 500 having two rotatable plug blades with an auxiliary contact to detect rotation of a second plug blade, according to one embodiment. The EVSE 500 may include a housing 202, a first rotatable blade 104, a first seal 512 disposed between the first rotatable blade 104 and the housing 202, and a first wire 112 connected to the first rotatable blade. The EVSE 500 may also include a second rotatable blade 106, a second seal 110 disposed between the second rotatable blade 106 and the housing 202, and a second wire 114. The EVSE 500 may also include an auxiliary contact 118 attached to the second rotatable blade 106 such that the auxiliary contact 118 rotates with the second rotatable blade 106. When the auxiliary contact 118 contacts a top contact of the set of contacts 116, the set of contacts 116 are forced closed. An electronics 510 may be in communication with the set of contacts 116 to detect when the set of contacts 116 are closed or open. A ground prong 108 may be fixed in position. A cable 508 may be connected to the housing 202 to provide power from the first rotatable blade 104 and second rotatable blade 106.

Figure 5B:
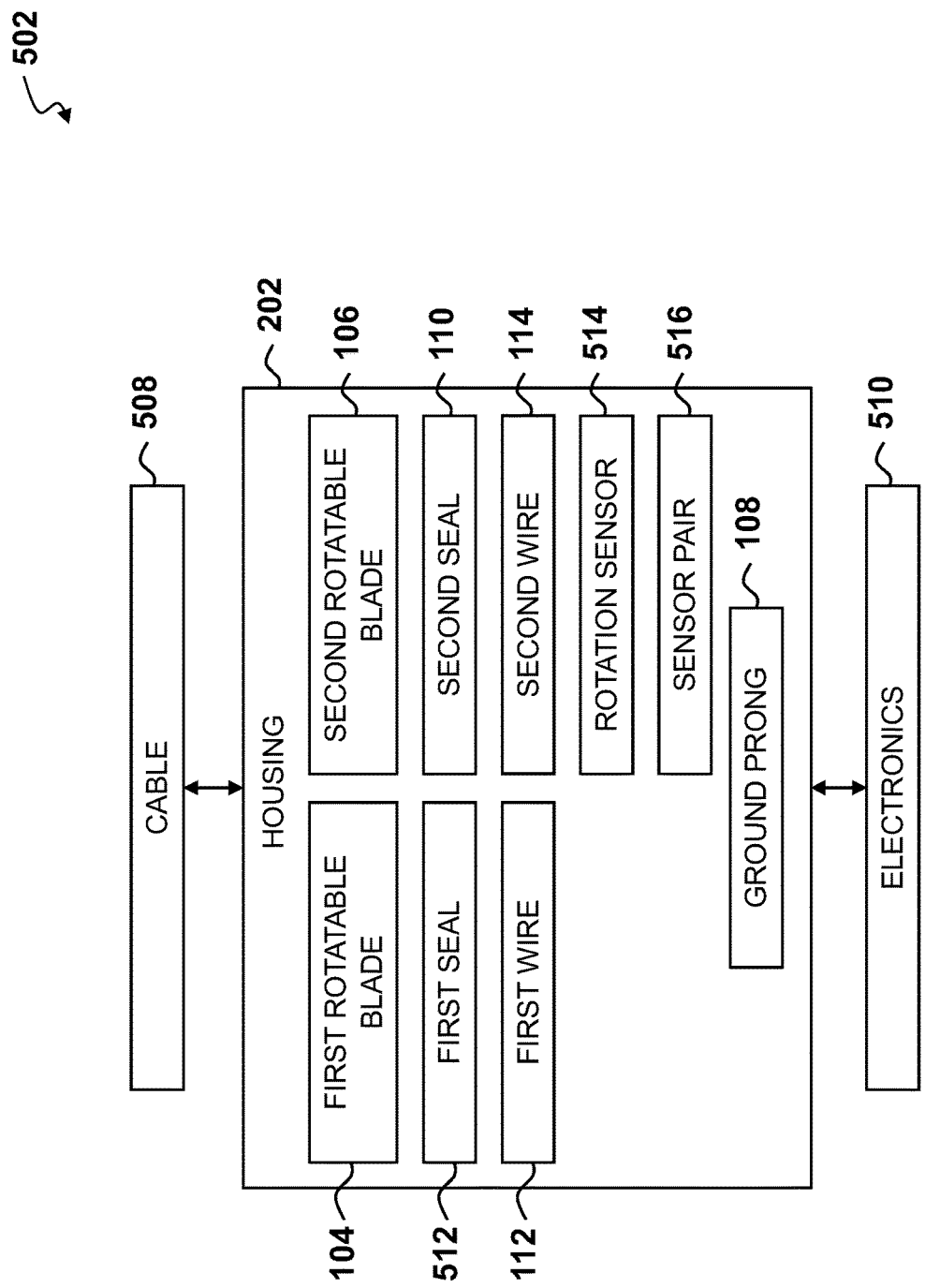
FIG. 5B depicts an exemplary system for a cordset EVSE having two rotatable plug blades with a rotation sensor to detect rotation of a second plug blade, according to one embodiment.

FIG. 5B depicts an exemplary system for a cordset EVSE 502 having two rotatable plug blades with a rotation sensor to detect rotation of a second plug blade, according to one embodiment. The EVSE 502 may include a housing 202, a first rotatable blade 104, a first seal 512 disposed between the first rotatable blade 104 and the housing 202, and a first wire 112 connected to the first rotatable blade 104. The EVSE 500 may also include a second rotatable blade 106, a second seal 110 disposed between the second rotatable blade 106 and the housing 202, and a second wire 114. The EVSE 500 may also include a rotation sensor 514 attached to the second rotatable blade 106. When the second rotatable blade 106 rotates it may detect a sensor pair 516 disposed on the housing. An electronics 510 may be in communication with the rotation sensor 514 to detect a position of the second rotatable blade 106. The rotation sensor 514 and sensor pair 516 may include: a Hall effect sensor to sense a presence of a magnet as the second rotatable blade 106 is rotated, an optical sensor with a shutter that goes between an emitter and receiver pair, and/or an inductive sensor that senses a presence or an absence of a ferromagnetic tab. A ground prong 108 may be fixed in position. A cable 508 may be connected to the housing 202 to provide power from the first rotatable blade 104 and second rotatable blade 106.

Figure 5C:
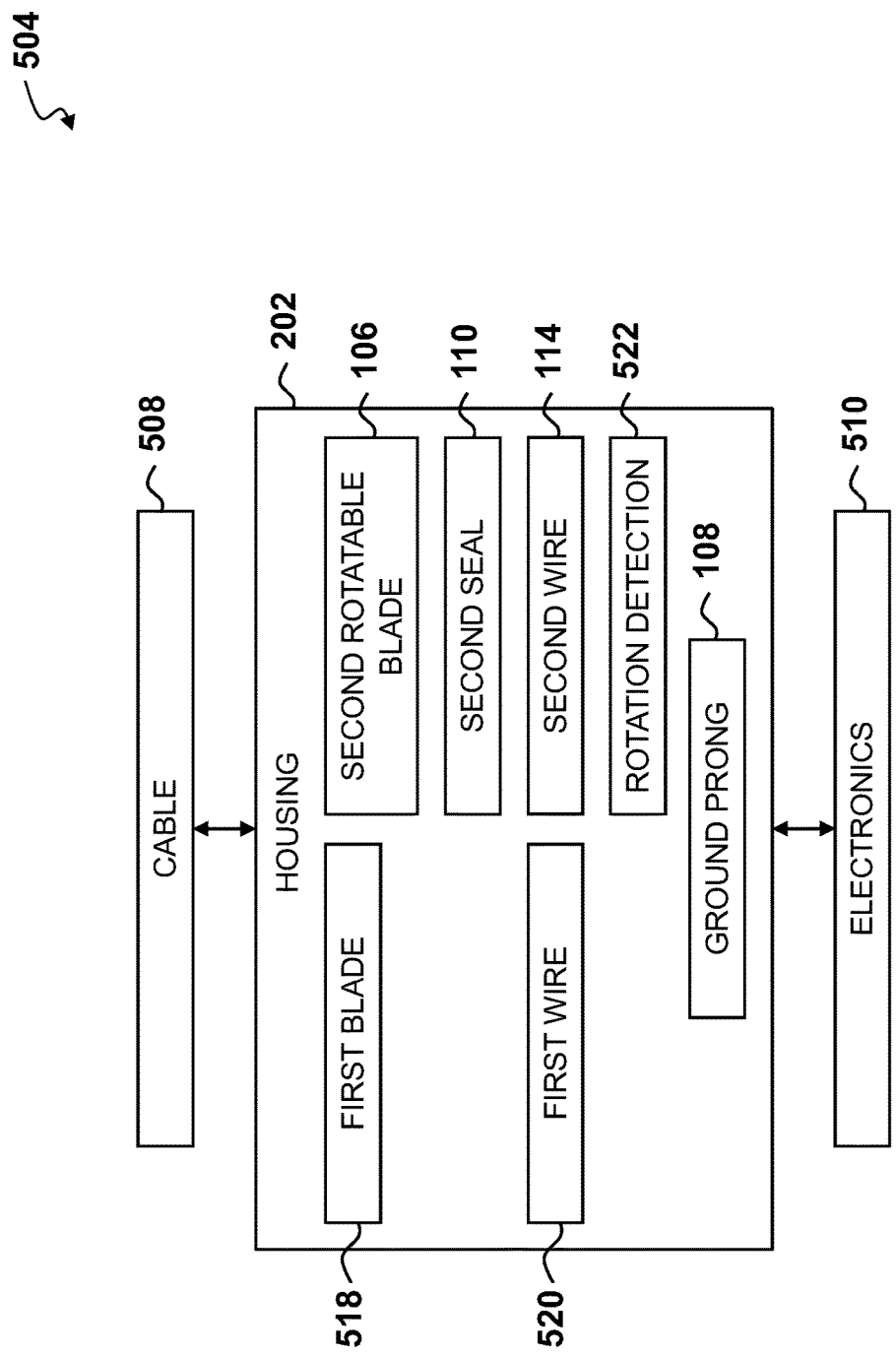
FIG. 5C depicts an exemplary system for a cordset EVSE having a fixed hot plug blade and a rotatable neutral plug blade, according to one embodiment.

FIG. 5C depicts an exemplary system for a cordset EVSE 504 having a fixed hot plug blade and a rotatable neutral plug blade, according to one embodiment. The EVSE 504 may include a housing 202, a first fixed blade 518, and a first wire 520 connected to the first fixed blade 518. The EVSE 500 may also include a second rotatable blade 106, a second seal 110 disposed between the second rotatable blade 106 and the housing 202, and a second wire 114. The EVSE 500 may also include a rotation detection 522 to detect a rotational position of the second rotatable blade 106. An electronics 510 may be in communication with the rotation detection 522 to detect a position of the second rotatable blade 106. A ground prong 108 may be fixed in position. A cable 508 may be connected to the housing 202 to provide power from the first blade 518 and second rotatable blade 106.

Figure 5D:
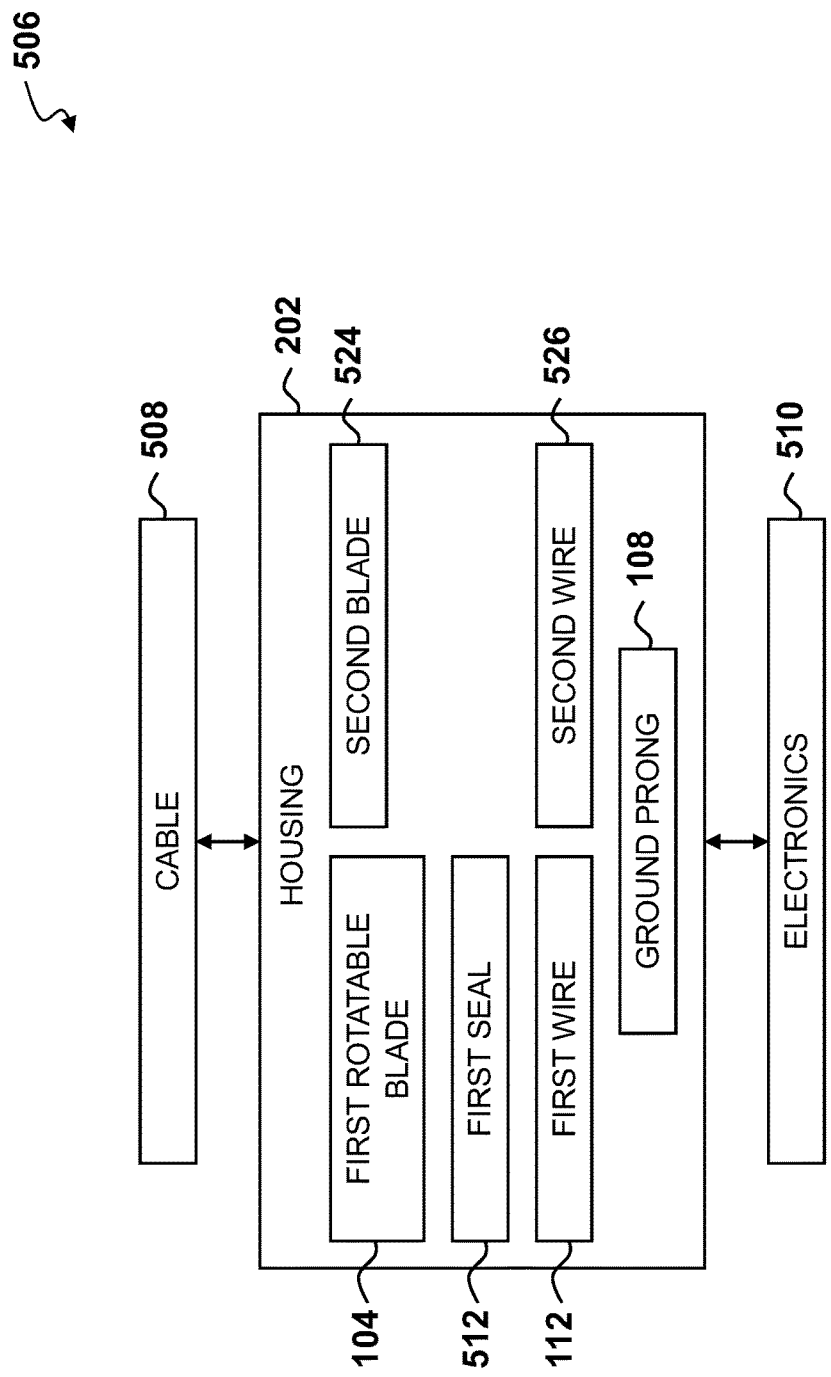
FIG. 5D depicts an exemplary system for a cordset EVSE having a rotatable hot plug blade and a fixed neutral plug blade, according to one embodiment.

FIG. 5D depicts an exemplary system for a cordset EVSE 506 having a rotatable plug blade and a fixed plug blade, according to one embodiment. The EVSE 506 may include a housing 202, a first rotatable blade 104, a first seal 512 disposed between the first rotatable blade 104 and the housing 202, and a first wire 112 connected to the first rotatable blade. The EVSE 500 may also include a second fixed blade 524 and a second wire 526. An electronics 510 may determine a voltage between the first rotatable blade 104 and the second fixed blade to detect a position of the first rotatable blade 104. A ground prong 108 may be fixed in position. A cable 508 may be connected to the housing 202 to provide power from the first rotatable blade 104 and second fixed blade 524.

Figure 6:
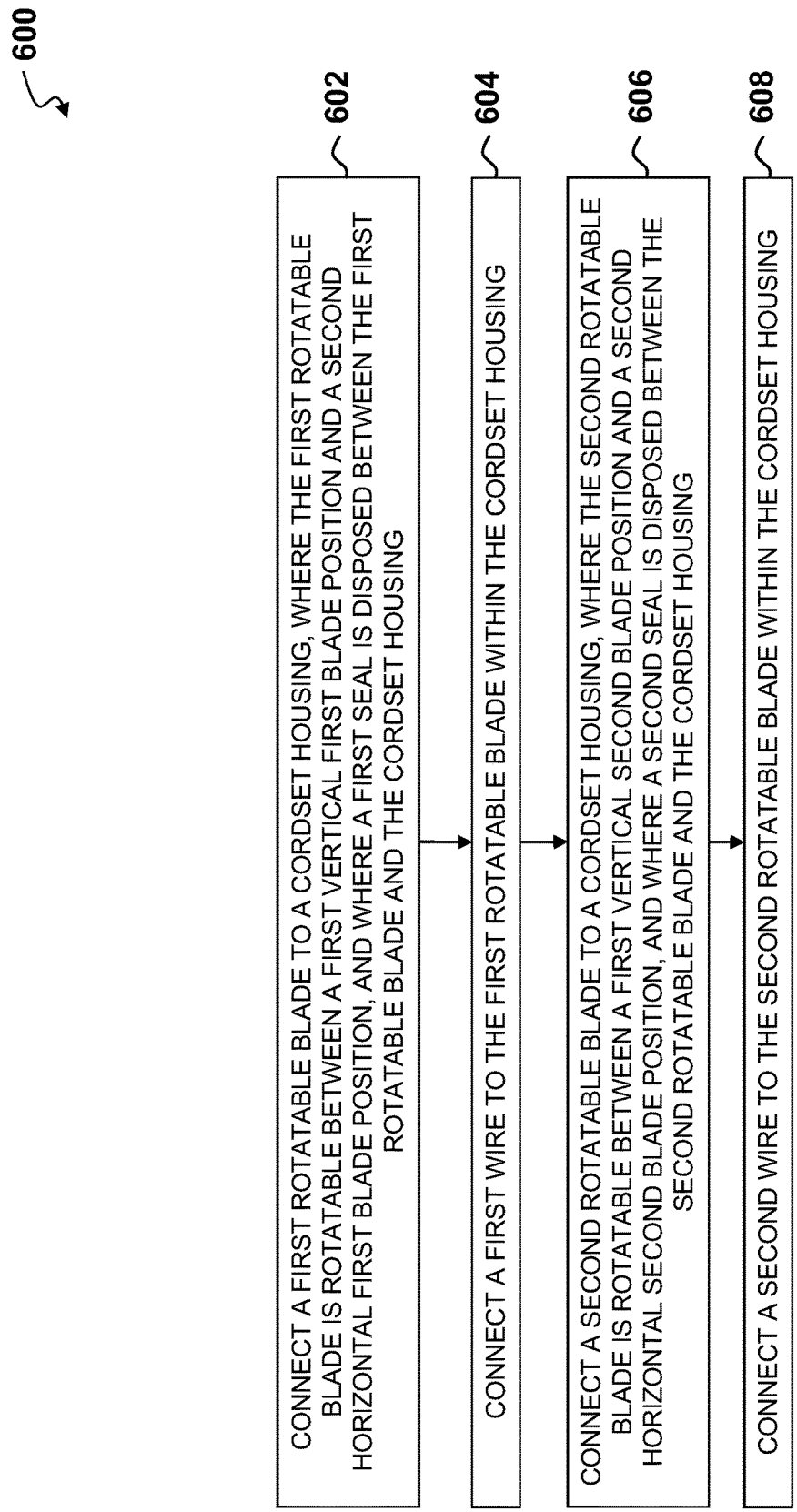
FIG. 6 depicts a flow chart of a method embodiment of assembling a cordset EVSE with rotatable plug blades, according to one embodiment.

FIG. 6 depicts a flow chart of a method embodiment 600 of assembling a cordset EVSE with rotatable plug blades, according to one embodiment. The method 600 may include connecting a first rotatable blade to a cordset housing, where the first rotatable blade is rotatable between a first vertical first blade position and a second horizontal first blade position, and where a first seal is disposed between the first rotatable blade and the cordset housing (step 602). The method 600 may then include connecting a first wire to the first rotatable blade within the cordset housing (step 604). The method 600 may then include connecting a second rotatable blade to a cordset housing, where the second rotatable blade is rotatable between a first vertical second blade position and a second horizontal second blade position, and where a second seal is disposed between the second rotatable blade and the cordset housing (step 606). The method 600 may then include connecting a second wire to the second rotatable blade within the cordset housing.

Figure 7:
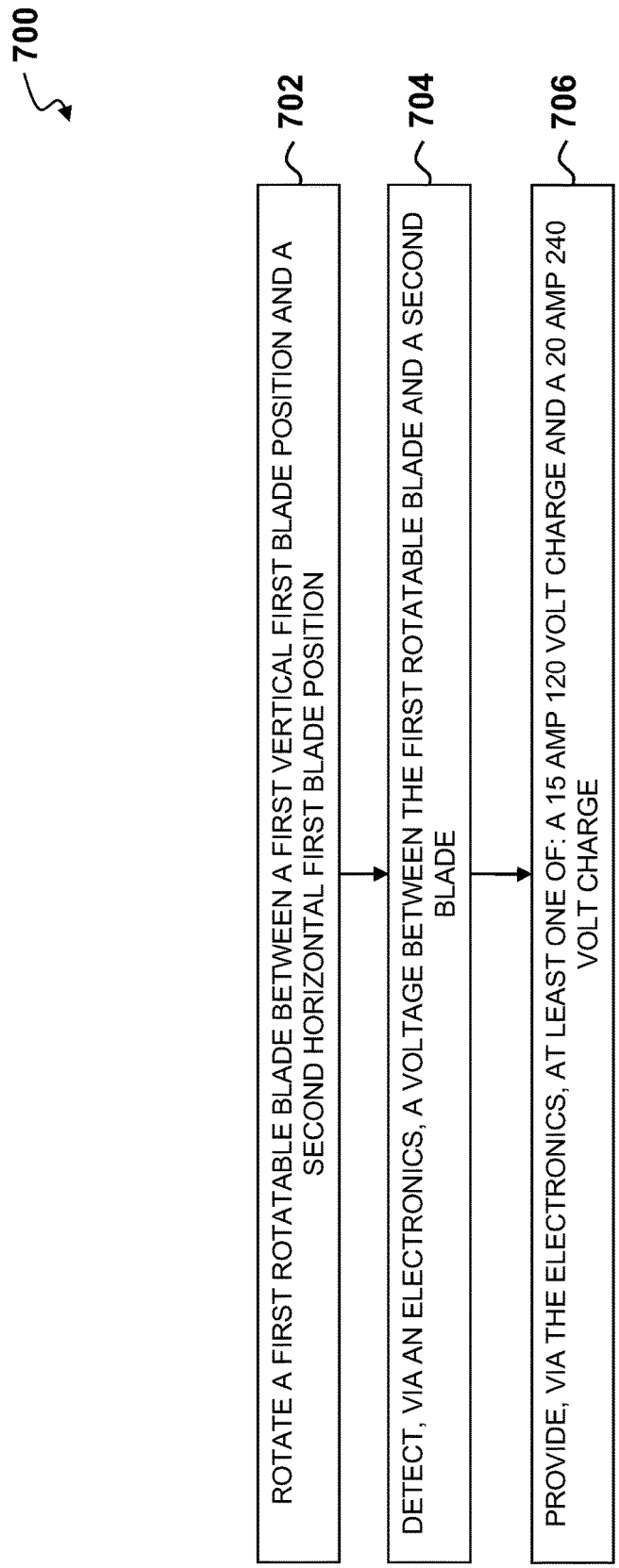
FIG. 7 depicts a flow chart of a method embodiment of rotating a hot plug blade of a cordset EVSE, according to one embodiment.

FIG. 7 depicts a flow chart of a method embodiment 700 of rotating a plug blade of a cordset EVSE, according to one embodiment. The method may include rotating a first rotatable blade between a first vertical first blade position and a second horizontal first blade position (step 702). The method 700 may then include detecting, via an electronics, a voltage between the first rotatable blade and a second blade (step 704). The method 700 may then include providing, via the electronics, at least one of: a 15 amp 120 volt charge and a 20 amp 240 volt charge (step 706).

Figure 8:
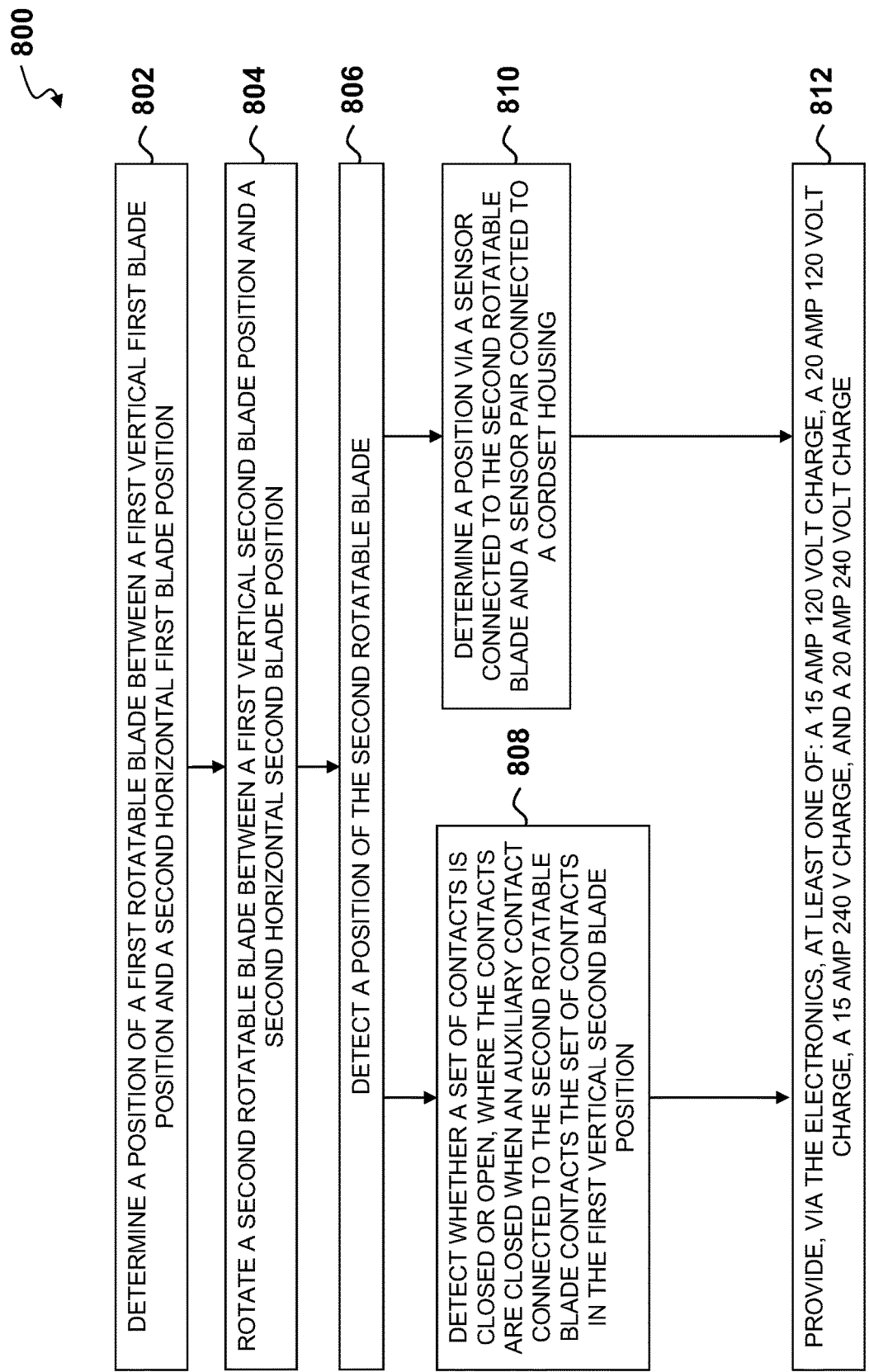
FIG. 8 depicts a flow chart of a method embodiment of rotating a neutral plug blade of a cordset EVSE, according to one embodiment.

FIG. 8 depicts a flow chart of a method embodiment 800 of rotating a plug blade of a cordset EVSE, according to one embodiment. The method 800 may include determining a position of a first rotatable blade between a first vertical first blade position and a second horizontal first blade position (step 802). The method 800 may then include rotating a second rotatable blade between a first vertical second blade position and a second horizontal second blade position (step 804). The method 800 may then include detecting a position of the second rotatable blade (step 806). The method 800 may then include detecting whether a set of contacts is closed or open, where the contacts are closed when an auxiliary contact connected to the second rotatable blade contacts the set of contacts in the first vertical second blade position (step 808) and/or determining a position via a sensor connected to the second rotatable blade and a sensor pair connected to a cordset housing (step 810). The method 800 may then include providing, via the electronics, at least one of: a 15 amp 120 volt charge, a 20 amp 120 volt charge, a 15 amp 240 v charge, and a 20 amp 240 volt charge.

Figure 9:
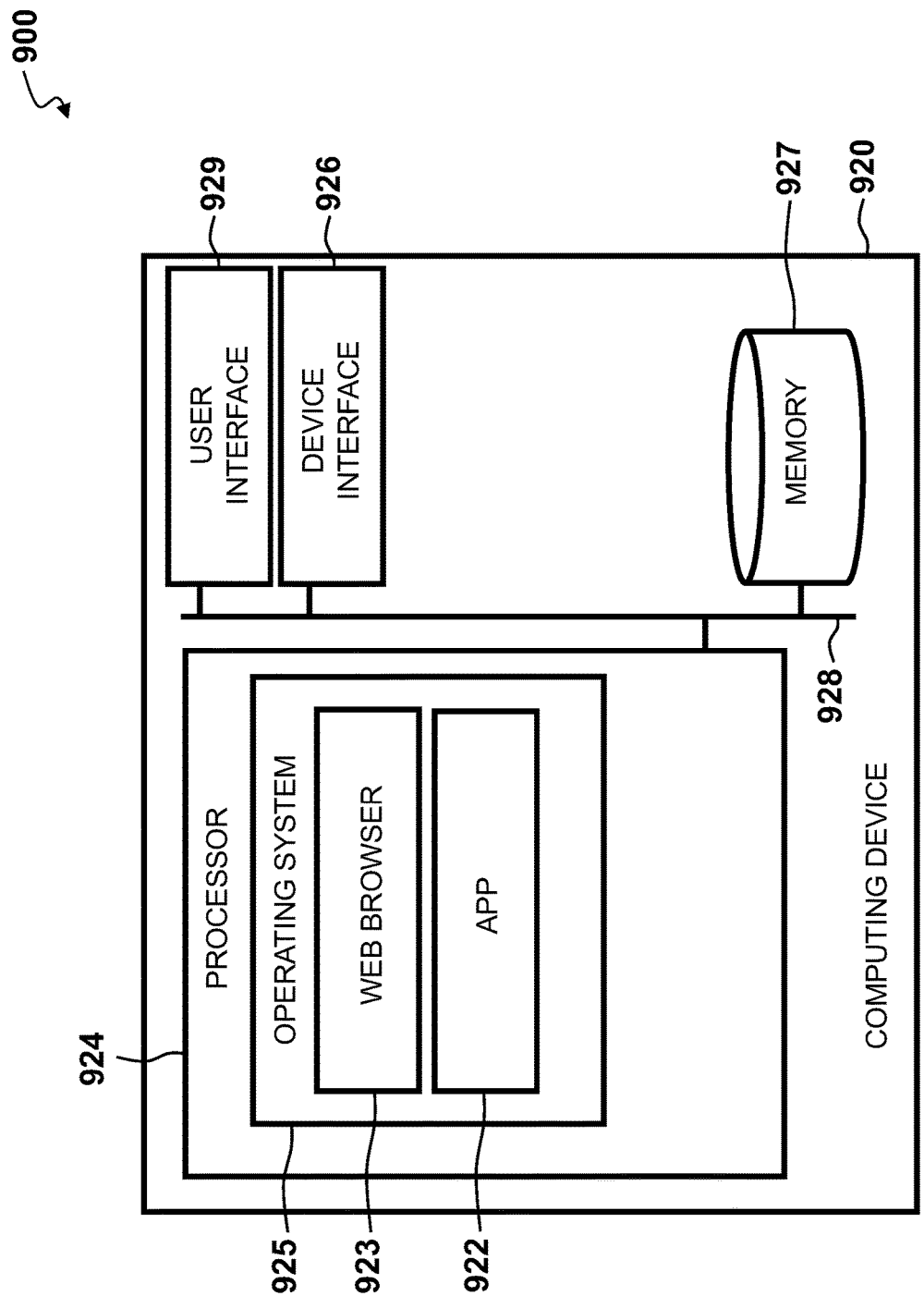
FIG. 9 illustrates an example top-level functional block diagram of a computing device embodiment, according to one embodiment.

FIG. 9 illustrates an example of a top-level functional block diagram of a computing device embodiment 900. The example operating environment is shown as a computing device 920 comprising a processor 924, such as a central processing unit (CPU), addressable memory 927, an external device interface 926, e.g., an optional universal serial bus port and related processing, and/or an Ethernet port and related processing, and an optional user interface 929, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 928. In some embodiments, via an operating system 925 such as one supporting a web browser 923 and applications 922, the processor 924 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 10:
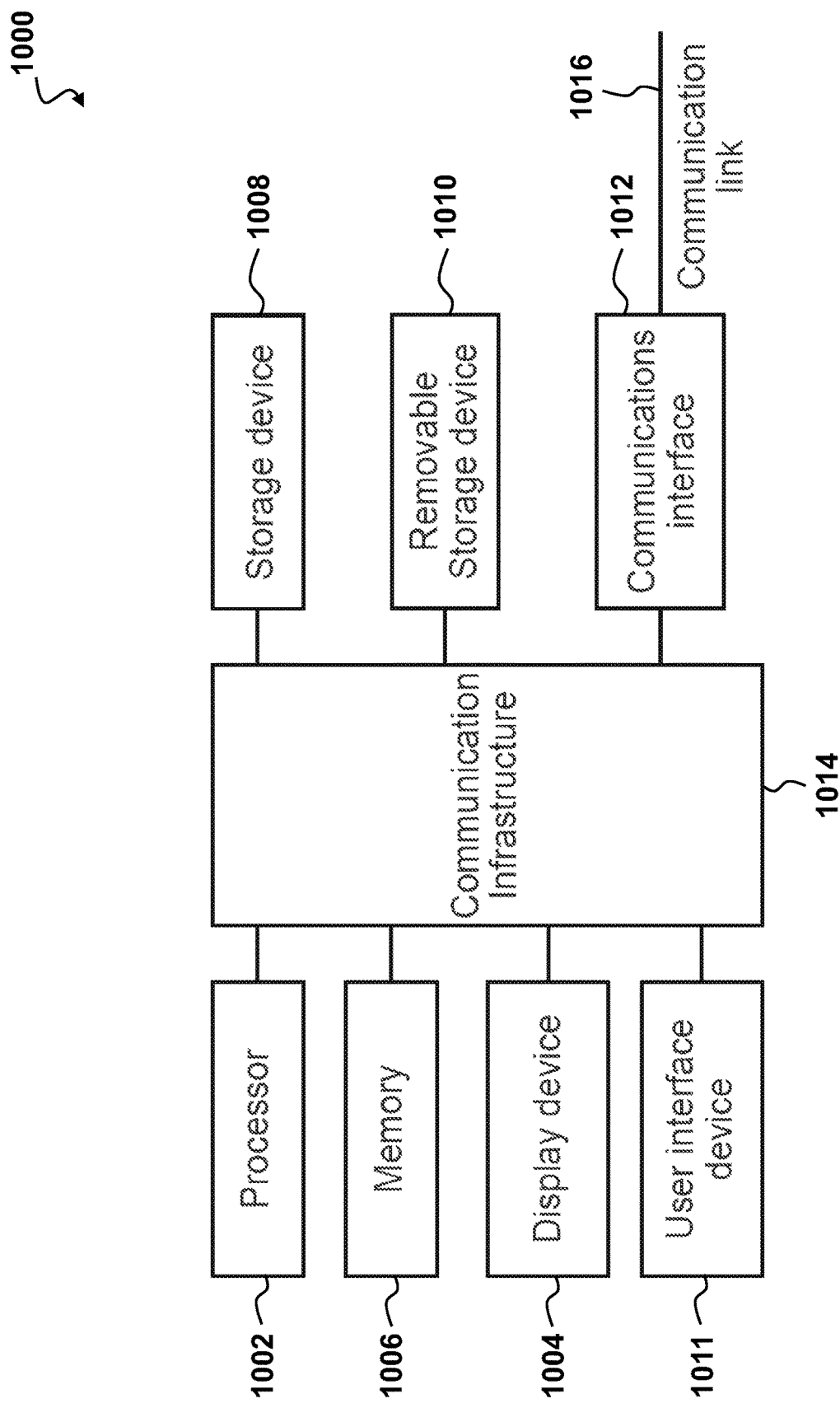
FIG. 10 shows a high-level block diagram and process of a computing system for implementing an embodiment of the system and process, according to one embodiment.

FIG. 10 is a high-level block diagram 1000 showing a computing system comprising a computer system useful for implementing an embodiment of the system and process, disclosed herein. Embodiments of the system may be implemented in different computing environments. The computer system includes one or more processors 1002, and can further include an electronic display device 1004 (e.g., for displaying graphics, text, and other data), a main memory 1006 (e.g., random access memory (RAM)), storage device 1008, a removable storage device 1010 (e.g., removable storage drive, a removable memory module, a magnetic tape drive, an optical disk drive, a computer readable medium having stored therein computer software and/or data), user interface device 1011 (e.g., keyboard, touch screen, keypad, pointing device), and a communication interface 1012 (e.g., modem, a network interface (such as an Ethernet card), a communications port, or a PCMCIA slot and card). The communication interface 1012 allows software and data to be transferred between the computer system and external devices. The system further includes a communications infrastructure 1014 (e.g., a communications bus, cross-over bar, or network) to which the aforementioned devices/modules are connected as shown.

Information transferred via communications interface 1014 may be in the form of signals such as electronic, electromagnetic, optical, or other signals capable of being received by communications interface 1014, via a communication link 1016 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1012. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 11:
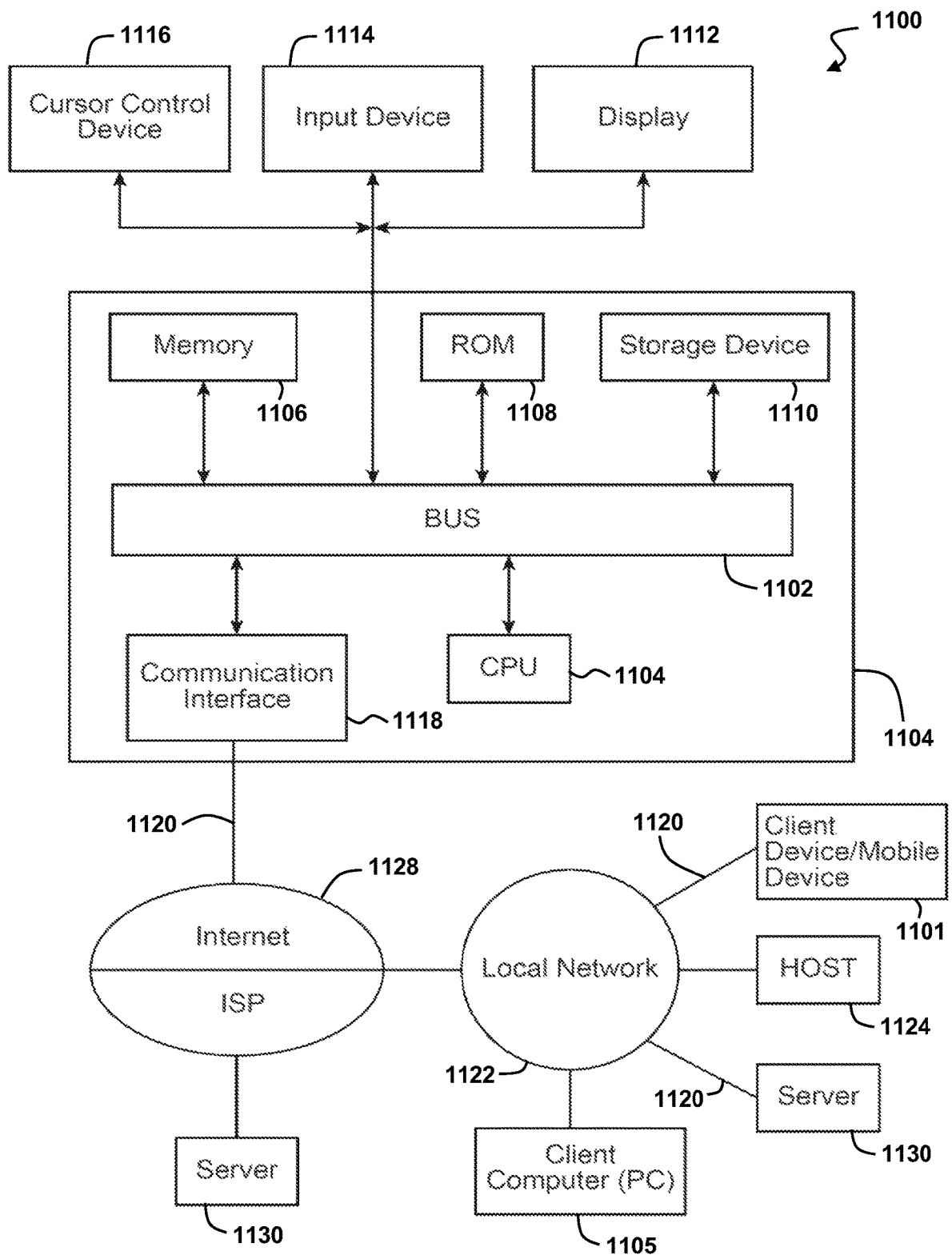
FIG. 11 shows a block diagram and process of an exemplary system in which an embodiment may be implemented, according to one embodiment.

FIG. 11 shows a block diagram of an example system 1100 in which an embodiment may be implemented. The system 1100 includes one or more client devices 1101 such as consumer electronics devices, connected to one or more server computing systems 1130. A server 1130 includes a bus 1102 or other communication mechanism for communicating information, and a processor (CPU) 1104 coupled with the bus 1102 for processing information. The server 1130 also includes a main memory 1106, such as a random access memory (RAM) or other dynamic storage device, coupled to the bus 1102 for storing information and instructions to be executed by the processor 1104. The main memory 1106 also may be used for storing temporary variables or other intermediate information during execution or instructions to be executed by the processor 1104. The server computer system 1130 further includes a read only memory (ROM) 1108 or other static storage device coupled to the bus 1102 for storing static information and instructions for the processor 1104. A storage device 1110, such as a magnetic disk or optical disk, is provided and coupled to the bus 1102 for storing information and instructions. The bus 1102 may contain, for example, thirty-two address lines for addressing video memory or main memory 1106. The bus 1102 can also include, for example, a 32-bit data bus for transferring data between and among the components, such as the CPU 1104, the main memory 1106, video memory and the storage 1110. Alternatively, multiplex data/address lines may be used instead of separate data and address lines.

The server 1130 may be coupled via the bus 1102 to a display 1112 for displaying information to a computer user. An input device 1114, including alphanumeric and other keys, is coupled to the bus 1102 for communicating information and command selections to the processor 1104. Another type or user input device comprises cursor control 1116, such as a mouse, a trackball, or cursor direction keys for communicating direction information and command selections to the processor 1104 and for controlling cursor movement on the display 1112.

According to one embodiment, the functions are performed by the processor 1104 executing one or more sequences of one or more instructions contained in the main memory 1106. Such instructions may be read into the main memory 1106 from another computer-readable medium, such as the storage device 1110. Execution of the sequences of instructions contained in the main memory 1106 causes the processor 1104 to perform the process steps described herein. One or more processors in a multi-processing arrangement may also be employed to execute the sequences of instructions contained in the main memory 1106. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1104 for execution. Such a medium may take many forms, including but not limited to, non-volatile media, volatile media, and transmission media. Non-volatile media includes, for example, optical or magnetic disks, such as the storage device 1110. Volatile media includes dynamic memory, such as the main memory 1106.

Transmission media includes coaxial cables, copper wire and fiber optics, including the wires that comprise the bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1104 for execution. For example, the instructions may initially be carried on a magnetic disk of a remote computer. The remote computer can load the instructions into its dynamic memory and send the instructions over a telephone line using a modem. A modem local to the server 1130 can receive the data on the telephone line and use an infrared transmitter to convert the data to an infrared signal. An infrared detector coupled to the bus 1102 can receive the data carried in the infrared signal and place the data on the bus 1102. The bus 1102 carries the data to the main memory 1106, from which the processor 1104 retrieves and executes the instructions. The instructions received from the main memory 1106 may optionally be stored on the storage device 1110 either before or after execution by the processor 1104.

The server 1130 also includes a communication interface 1118 coupled to the bus 1102. The communication interface 1118 provides a two-way data communication coupling to a network link 1120 that is connected to the world wide packet data communication network now commonly referred to as the Internet 1128. The Internet 1128 uses electrical, electromagnetic or optical signals that carry digital data streams. The signals through the various networks and the signals on the network link 1120 and through the communication interface 1118, which carry the digital data to and from the server 1130, are exemplary forms or carrier waves transporting the information.

In another embodiment of the server 1130, interface 1118 is connected to a network 1122 via a communication link 1120. For example, the communication interface 1118 may be an integrated services digital network (ISDN) card or a modem to provide a data communication connection to a corresponding type of telephone line, which can comprise part of the network link 1120. As another example, the communication interface 1118 may be a local area network (LAN) card to provide a data communication connection to a compatible LAN. Wireless links may also be implemented. In any such implementation, the communication interface 1118 sends and receives electrical electromagnetic or optical signals that carry digital data streams representing various types of information.

The network link 1120 typically provides data communication through one or more networks to other data devices. For example, the network link 1120 may provide a connection through the local network 1122 to a host computer 1124 or to data equipment operated by an Internet Service Provider (ISP). The ISP in turn provides data communication services through the Internet 1128. The local network 1122 and the Internet 1128 both use electrical, electromagnetic or optical signals that carry digital data streams. The signals through the various networks and the signals on the network link 1120 and through the communication interface 1118, which carry the digital data to and from the server 1130, are exemplary forms or carrier waves transporting the information.

The server 1130 can send/receive messages and data, including e-mail, program code, through the network, the network link 1120 and the communication interface 1118. Further, the communication interface 1118 can comprise a USB/Tuner and the network link 1120 may be an antenna or cable for connecting the server 1130 to a cable provider, satellite provider or other terrestrial transmission system for receiving messages, data and program code from another source.

The example versions of the embodiments described herein may be implemented as logical operations in a distributed processing system such as the system 1100 including the servers 1130. The logical operations of the embodiments may be implemented as a sequence of steps executing in the server 1130, and as interconnected machine modules within the system 1100. The implementation is a matter of choice and can depend on performance of the system 1100 implementing the embodiments. As such, the logical operations constituting said example versions of the embodiments are referred to for e.g., as operations, steps or modules.

Similar to a server 1130 described above, a client device 1101 can include a processor, memory, storage device, display, input device and communication interface (e.g., e-mail interface) for connecting the client device to the Internet 1128, the ISP, or LAN 1122, for communication with the servers 1130.

The system 1100 can further include computers (e.g., personal computers, computing nodes) 1105 operating in the same manner as client devices 1101, where a user can utilize one or more computers 1105 to manage data in the server 1130.

Figure 12:
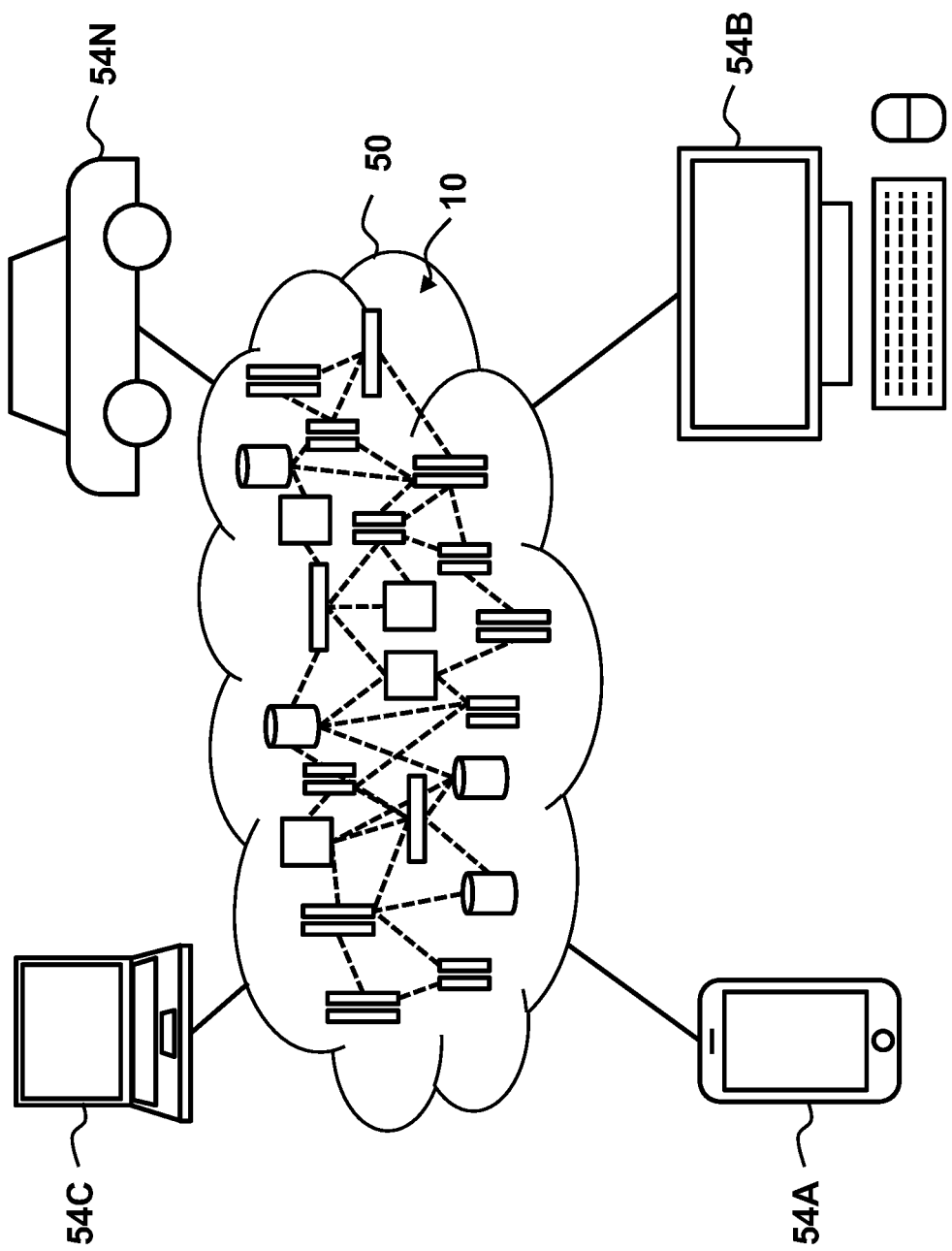
FIG. 12 depicts a cloud-computing environment for implementing an embodiment of the system and process disclosed herein, according to one embodiment

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial system (UAS) 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
a cordset having a housing, the cordset comprising:
a first rotatable blade, wherein the first rotatable blade is rotatable between a first vertical first blade position and a second horizontal first blade position;
a second rotatable blade, wherein the second rotatable blade is rotatable between a first vertical second blade position and a second horizontal second blade position;
an auxiliary contact connected to the second rotatable blade, wherein the auxiliary contact rotates with the second rotatable blade between the first vertical second blade position and the second horizontal second blade position; and
a fixed ground prong.

2. The system of claim 1, wherein the cordset further comprises:
a first seal disposed about the first rotatable blade.

3. The system of claim 2, wherein the cordset further comprises:
a first wire connected to the first rotatable blade, wherein the first wire is at least one of: coiled, flexible, and rotatable.

4. The system of claim 3, wherein the cordset further comprises:
a second seal disposed about the second rotatable blade.

5. The system of claim 4, wherein the cordset further comprises:
a second wire connected to the second rotatable blade, wherein the second wire is at least one of: coiled, flexible, and rotatable.

6. The system of claim 1, wherein the cordset further comprises:
a set of contacts, wherein the set of contacts close when contacted by auxiliary contact when the second rotatable blade is in the second horizontal second blade position, and wherein the set of contacts open when not contacted by auxiliary contact when the second rotatable blade is in the first vertical second blade position.

7. The system of claim 1, further comprising:
an electronics, wherein the electronics are in communication with the first rotatable blade and the second rotatable blade.

8. A The system comprising:
a cordset having a housing, the cordset comprising:
a first rotatable blade, wherein the first rotatable blade is rotatable between a first vertical first blade position and a second horizontal first blade position;
a second rotatable blade, wherein the second rotatable blade is rotatable between a first vertical second blade position and a second horizontal second blade position;
a fixed ground prong;
a rotation sensor connected to the second rotatable blade; and
a sensor pair, wherein the sensor pair is configured to determine a position of the rotation sensor as at least one of: the first vertical second blade position and the second horizontal second blade position.

9. The system of claim 8, wherein the rotation sensor is a Hall effect sensor and the sensor pair is a magnet.

10. A The system comprising:
a cordset having a housing, the cordset comprising:
a first rotatable blade, wherein the first rotatable blade is rotatable between a first vertical first blade position and a second horizontal first blade position;
a second rotatable blade, wherein the second rotatable blade is rotatable between a first vertical second blade position and a second horizontal second blade position; and
an electronics, wherein the electronics are in communication with the first rotatable blade and the second rotatable blade, wherein the electronics are configured to recognize a plug type the cordset is connected to based on at least one of: a voltage between the first rotatable blade and the second rotatable blade, and a position of the second rotatable blade as the first vertical second blade position and the second horizontal second blade position.

11. A method, comprising:
rotating a first rotatable blade between a first vertical first blade position and a second horizontal first blade position;
detecting, via an electronics, a voltage between the first rotatable blade and a second rotatable blade of a cordset; and
providing, via the electronics, at least one of: a first amperage and voltage charge and a second amperage and voltage charge;
wherein the first rotatable blade is rotated to the second horizontal first blade position when the electronics provides the second amperage and voltage charge.

12. The method of claim 11, wherein the first rotatable blade is rotated to the first vertical first blade position when the electronics provides the first amperage and voltage charge.

13. The method of claim 11, wherein the second blade of the cordset is in a vertical second blade position, wherein the vertical second blade position of the second blade is parallel to the first vertical first blade position.

14. A method, comprising:
determining a position of a first rotatable blade between a first vertical first blade position and a second horizontal first blade position;
rotating a second rotatable blade between a first vertical second blade position and a second horizontal second blade position;
detecting a position of the second rotatable blade, wherein detecting the position of the second rotatable blade comprises: detecting whether a set of contacts are closed or open, wherein the set of contacts are closed when an auxiliary contact connected to the second rotatable blade contacts the set of contacts in the first vertical second blade position, and wherein the set of contacts are open when the second rotatable blade is in the second horizontal second blade position; and
providing, via an electronics, at least one of: a first amperage and voltage charge, a second amperage and voltage charge, a third amperage and voltage charge, and a fourth amperage and voltage charge.

15. A method comprising:
determining a position of a first rotatable blade between a first vertical first blade position and a second horizontal first blade position;
rotating a second rotatable blade between a first vertical second blade position and a second horizontal second blade position;
detecting a position of the second rotatable blade, wherein detecting the position of the second rotatable blade comprises: determining a position of the second rotatable blade via a sensor connected to the second rotatable blade and a sensor pair connected to a cordset housing; and providing, via an electronics, at least one of: a first amperage and voltage charge, a second amperage and voltage charge, a third amperage and voltage charge, and a fourth amperage and voltage charge.

16. A method comprising:
determining a position of a first rotatable blade between a first vertical first blade position and a second horizontal first blade position;
rotating a second rotatable blade between a first vertical second blade position and a second horizontal second blade position;
detecting a position of the second rotatable blade; and
providing, via an electronics, at least one of: a first amperage and voltage charge, a second amperage and voltage charge, a third amperage and voltage charge, and a fourth amperage and voltage charge;
wherein when the first rotatable blade is determined to be in the first vertical first blade position, the provided charge is the first amperage and voltage charge when the detected position of the second rotatable blade is the first vertical second blade position, and the provided charge is the second amperage and voltage charge when the detected position of the second rotatable blade is the second horizontal second blade position.

17. A method comprising:
determining a position of a first rotatable blade between a first vertical first blade position and a second horizontal first blade position;
rotating a second rotatable blade between a first vertical second blade position and a second horizontal second blade position;
detecting a position of the second rotatable blade; and
providing, via an electronics, at least one of: a first amperage and voltage charge, a second amperage and voltage charge, a third amperage and voltage charge, and a fourth amperage and voltage charge;
wherein when the detected position of the second rotatable blade is the first vertical second blade position, the provided charge is the first amperage and voltage charge when the determined position of the first rotatable blade is the first vertical first blade position, and the provided charge is the fourth amperage and voltage charge when the determined position of the first rotatable blade is the second horizontal first blade position.

* * * * *